O. F. RUSSLER.
METHOD AND APPARATUS FOR LINING BUSHINGS.
APPLICATION FILED JULY 31, 1919.
1,321,478.
Patented Nov. 11, 1919.
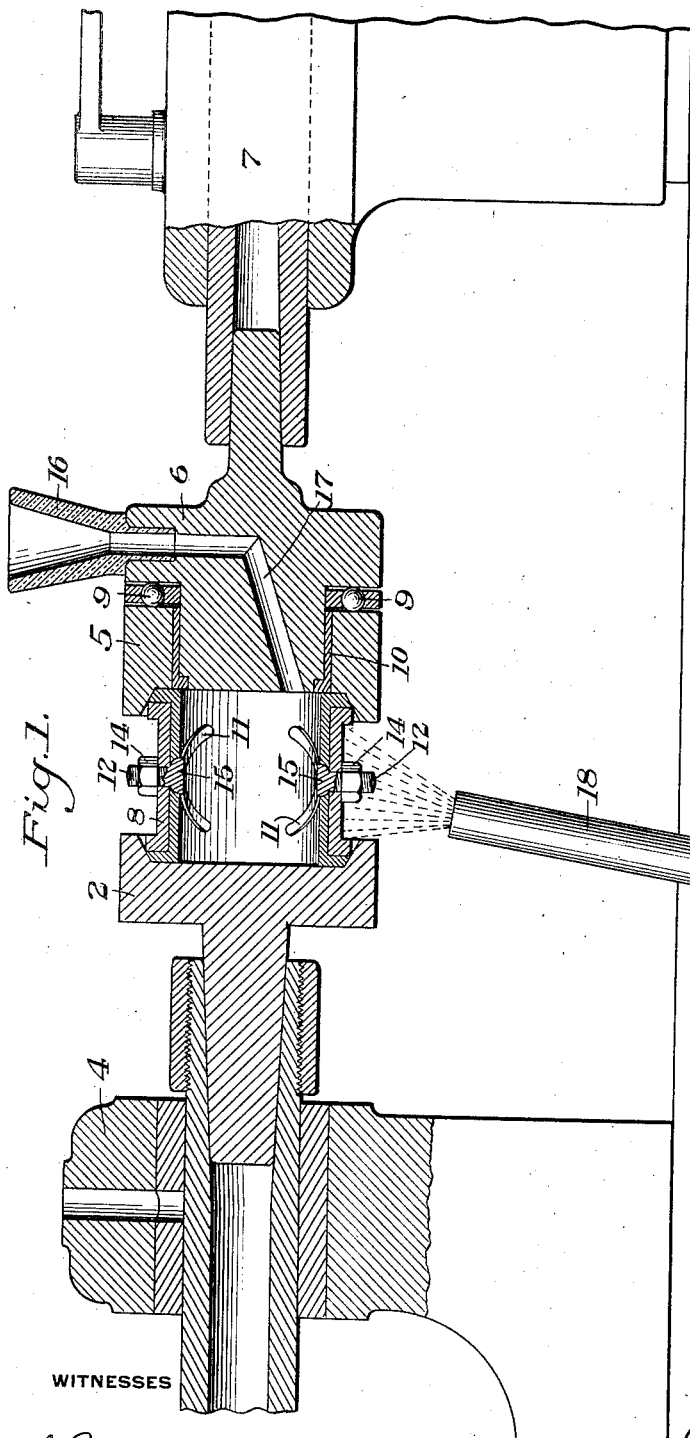
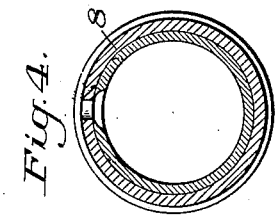
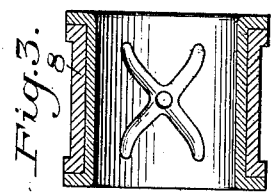

UNITED STATES PATENT OFFICE.

OSCAR F. RUSSLER, OF NEW CASTLE, PENNSYLVANIA, ASSIGNOR TO JOHNSON BRONZE COMPANY, OF NEW CASTLE, PENNSYLVANIA, A CORPORATION OF PENNSYLVANIA.

METHOD AND APPARATUS FOR LINING BUSHINGS.

1,321,478.	Specification of Letters Patent.	Patented Nov. 11, 1919.

Application filed July 31, 1919. Serial No. 314,516.

*To all whom it may concern:*

Be it known that I, OSCAR F. RUSSLER, a citizen of the United States, residing at New Castle, in the county of Lawrence and State of Pennsylvania, have invented a new and useful Improvement in Methods and Apparatus for Lining Bushings, of which the following is a full, clear, and exact description, reference being had to the accompanying drawings, forming part of this specification.

The present invention relates broadly to bushings, and more particularly, to a method and apparatus for producing lined bushings having an oil groove therein.

The principal object of the present invention is to line the shell of a bushing with a suitable material by means of centrifugal force, and at the same time form one or more oil grooves therein.

A further object of the present invention is to provide an oil groove-forming member which may be readily removed after the lining has been formed in the shell, to permit reaming or broaching of the bushing.

Still another object of the present invention is to provide an apparatus for making bushings of this type, which apparatus may be used in conjunction with any standard lathe or similar construction.

The foregoing and other objects, together with their attendant advantages, will be apparent as the invention becomes better understood by reference to the accompanying specification and drawings forming a part thereof, it being premised that changes may be made in the various details and the manner of operation within the scope of the appended claims without departing from the spirit of the invention.

Figure 1 is a view partly in section illustrating the apparatus in position for lining the shell of a bushing.

Fig. 2 is a longitudinal section through one form of finished bushing.

Fig. 3 is a longitudinal section on the line III—III of Fig. 2, and

Fig. 4 is a cross section of a finished bushing having a single oil groove formed therein.

It has heretofore been proposed to form oil grooves in bearings or bushings by casting in a stationary mold. This method has to a large degree been unsuccessful due to the fact that it is difficult to cast a true groove in this manner, and due to the formation of voids throughout the body of the bushing. It has also been proposed to provide centrifugally operated molds with radially adjustable parts, but so far as I am aware, it is new to form oil grooves by centrifugal force, simultaneously with the formation of a lining in the shell of the bushing.

Actual practice has demonstrated that by the method of casting bushings herein described, an oil groove can be formed having regular and comparatively smooth or finished surfaces, so that upon reaming or broaching the bushing the same is ready for use. It is believed that these advantageous results are produced due to the combination of forces acting on the material being cast. The centrifugal force tends to throw the material compactly against the shell of the bushing, while the core forming the oil groove, coöperates therewith to produce a highly efficient casting provided with an oil groove.

Referring more particularly to the drawings, I have illustrated my improved casting apparatus in position for casting a lining in a suitable shell. This apparatus comprises a chuck 2 suitably secured so as to be rotated in any desired manner by the headstock of an ordinary lathe or similar machine. If desired, an intermediate bearing 4, coöperating with the chuck 2, may be employed. A second chuck member 5 is rotatably mounted on the hollow hub 6, carried by the tail-stock 7 of the lathe.

Clamped between the chucks 2 and 5, is a shell 8 constituting a portion of the bushing which is to be lined with a suitable bearing material. Upon placing the shell 8 in position between the chucks, and rotating the chuck 2, the chuck 5 will be driven entirely by friction. To resist the end thrust of the chuck 5, I may provide a suitable ball bearing 9 between said chuck and an enlargement formed on the hub 6. If desired, the hub 6 may be also provided with a packing 10.

Carried by the shell 8 are one or more removable oil groove-forming cores 11. These cores may be of any desired configuration to produce an approved type of oil groove in the bushing. As illustrated, they comprise a central lug 12 threaded to receive a nut 14 to hold the same in position in the shell through which the lug 12 extends. For limiting the outward movement of the cores, and for forming a cavity at the intersection of the various oil grooves, the cores may be provided with an enlargement 15.

With the core piece 11 and the shell 8 in position between the chucks, the chuck 2 is rotated in the manner described, thereby frictionally driving the chuck 5. At this time molten material for forming the lining in the bushing is fed through the funnel 16 and passes through the opening 17 in the hub member into the interior of the shell. Due to the centrifugal action, this material is forcibly and evenly deposited on the shell, with the exception of that portion thereof which is practically covered by the core piece 11.

It will be understood that the arms of the core piece are of a thickness slightly greater than the depth of the oil groove to be produced and that normally they are held in spaced relation to the interior wall of the shell 8 by means of the enlargement 15. A portion of the material will therefore be forced in back of the core pieces and, due to the combined centrifugal action exerted thereon and to the casting effect produced by the surface of the core piece, an oil groove having a substantially finished surface will be produced. If desired, during the lining operation I may subject the shell to an air blast issuing from a suitable jet, or the like, 18.

After the desired amount of material has been fed to the interior of the shell, and the chucks have been rotated for a sufficiently long period to cool the material, the shell with its lining is removed from the chucks and, after removing the core pieces 11, the lining is then reamed or broached in any well known manner.

In Fig. 2 I have illustrated a finished bushing having diametrically opposite oil grooves formed therein, while in Fig. 4, I have illustrated a bushing having a single oil groove.

It has been found that in making bushings by the apparatus and method herein described, that the surface of the main body of the lining is not as smooth as the surface of the oil groove. For this reason, it is believed that a peculiar and advantageous result is produced by the employment of oil-forming grooves for the centrifugal casting of bushings.

I claim:

1. The method of making bushings, comprising the steps of providing a bushing shell with an oil groove-forming core, rotating the shell and core at a high speed, and feeding a molten material to the interior of the shell, substantially as described.

2. The method of making bushings, comprising the steps of clamping a shell in position, securing a core piece therein, rotating the shell and core piece at a high speed, and feeding a bushing lining material to the interior of the shell, substantially as described.

3. The method of forming bushings, comprising the steps of clamping a shell in position, detachably securing an oil groove-forming core piece therein, rotating the shell and core piece at a high speed, and feeding a bushing lining material to the interior of the shell; substantially as described.

4. The method of making bushings, comprising the steps of securing an oil groove-forming piece in spaced relation to the interior of a bushing shell, clamping the shell between rotatable members, rotating the shell and core piece, and feeding a bushing lining material to the interior of said shell during the rotation thereof, substantially as described.

5. An apparatus for centrifugally forming bushings, comprising a shell, an oil groove-forming core piece projecting within the shell in spaced relation to the interior walls thereof, and means for securing the core piece in position, substantially as described.

6. An apparatus for forming bushings, comprising a plurality of chucks adapted to receive therebetween a bushing shell, means for rotating one of said chucks, and means for feeding a bushing lining material through another of said chucks, substantially as described.

In testimony whereof I have hereunto set my hand.

OSCAR F. RUSSLER.